(12) United States Patent
Chung

(10) Patent No.: US 6,237,832 B1
(45) Date of Patent: May 29, 2001

(54) WAVE SOLDERING FIXTURE

(76) Inventor: Henry Chung, 3478 Del Norte Dr., San Jose, CA (US) 95132

( * ) Notice: Subject to any disclaimer, the term of this patent is extended or adjusted under 35 U.S.C. 154(b) by 0 days.

(21) Appl. No.: 09/420,179

(22) Filed: Oct. 18, 1999

(51) Int. Cl.[7] .............................. B23K 37/00; B23K 1/08; B23K 20/14
(52) U.S. Cl. ............................ 228/44.7; 228/37; 228/39; 228/43
(58) Field of Search .............................. 228/44.7, 37, 43, 228/39

(56) References Cited

U.S. PATENT DOCUMENTS

| | | | |
|---|---|---|---|
| 4,655,164 | * | 4/1987 | Nelson et al. ........................ 118/503 |
| 4,720,034 | * | 1/1988 | Lee ........................................ 228/37 |
| 5,456,402 | * | 10/1995 | Curtin .................................... 228/43 |
| 5,785,307 | * | 7/1998 | Chung .............................. 269/254 CS |
| 5,820,013 | * | 10/1998 | Ortiz ...................................... 228/43 |

* cited by examiner

Primary Examiner—Patrick Ryan
Assistant Examiner—Zidia T. Pittman
(74) Attorney, Agent, or Firm—Robert Samuel Smith

(57) ABSTRACT

An apparatus used in a process for supporting a printed circuit board during a wave soldering operation including a frame with a frame opening in which a surface of the frame supports the board and also serves as a reference surface for vertically positioning the board above the solder pool. The board is secured against the reference surface with spring loaded clamps. Stiffeners preferably being an aluminum extrusion having a Tee or angle cross section is mounted along the outside edge of the reference surface of the frame and has a second reference surface facing in a direction opposite the reference surface of the frame. The second reference surface on the extrusion is accessible for support by a slide rail so that the height of the reference surface of the frame above the surface of the pool is independent of the thickness of the board or frame. A board support bar for minimizing warpage of the board from heat is disclosed as well as a hold down bar that secures components on the board so that they do not float away when contacted by the solder wave.

22 Claims, 4 Drawing Sheets

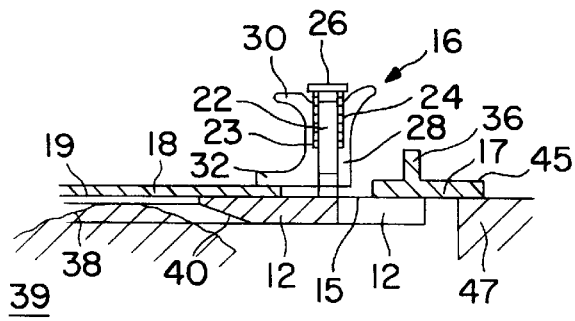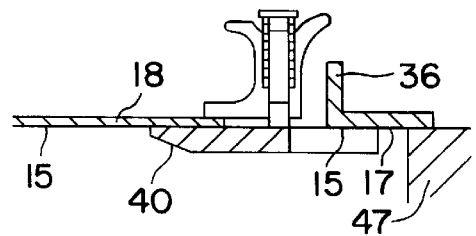
FIG. 3A   FIG. 3B
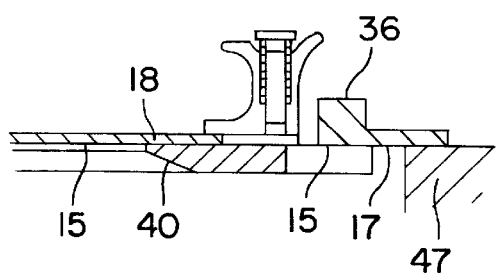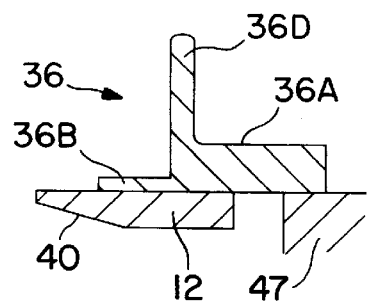
FIG. 3C   FIG. 3D
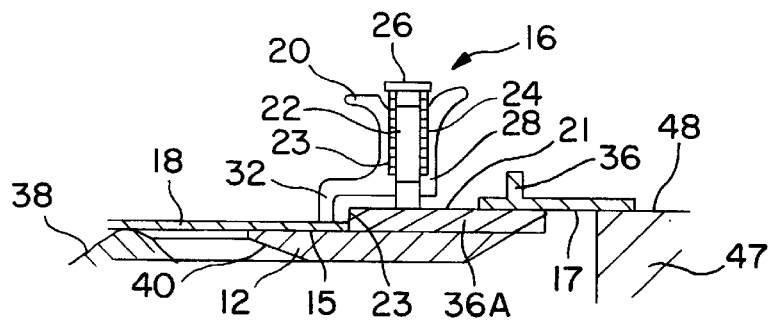
FIG. 4

WAVE SOLDERING FIXTURE

FIELD OF THE INVENTION

This invention relates to apparatus for assembling components on printed circuit boards PCBs and particularly to a fixture that supports the PCB through a wave soldering step. In the context of this specification and in accordance with the practices of the art, the terms, pallet, fixture, carrier and rack will be understood to have a common meaning.

BACKGROUND AND INFORMATION DISCLOSURE

The technology for manufacturing circuits comprising components mounted on boards has evolved continuously during the past fifty years keeping pace with the evolution of discrete semiconductor devices to present high density integrated circuits on a chip.

In the earliest techniques for the manufacture of PCBs, components were hand soldered onto the board. The next evolutionary step involved exposing the unsupported PCB to a solder wave. The problem with this technique was that the trailing and leading sides of the PCB had no support, thus causing the middle of the board to bow in the middle from the front to the back. This led to the technique of laying the PCB on a fixture which was a pallet having a "window" opening. When double sided PCBs were introduced having components on both sides, the "selective wave pallet was introduced which was designed to cover and protect components on the bottom of the PCB and allow the solder wave to enter cavities that are milled in the board. Registration of the PCB with the pallet was maintained by milling a depresseion in the pallet having the outline of the PCB so that the board was laid in the depression. Previous technology also used tooling pins for registration in some cases.

With the demand for greater density of components (IC's), exposure of the PCB to the heat of a solder wave at 450° F. became a more important issue. This led to the development of the "mask wave" pallet which was used even though there were no components on the bottom of the PCB. This pallet was a full sheet with only holes corresponding to pin through locations permitting exposure to the solder wave.

Pallets according to present practice combine all of the features of the window frame pallet, the selective pallet, and the masking pallet. All of these techniques, used separately or in combination, present limitations to the continued demand for greater component density and economy of manufacture. These techniques include the machining of pockets in the pallet for nesting the PCB which must be very accurate in order to maintain accurate registration of the PCB with the pallet. Even with accurate machining of the pockets, differences in heat expansion between the pallet and PCB complicate the problem of maintaining registration. The machining of pockets requires that the pallet sheet have thickness that is greater than a minimum thickness necessary for the machining operation. The amount of heat absorbed by the pallet is proportional to the thickness of the pallet and the efficiency of the soldering process is diminished by increased absorbtion of heat. Therefore, common practice is to select a pallet thickness depending on PCB design.

Variation of the thickness of the pallet requires that the height of the crest of the solder wave must be adjusted according to the thickness of the pallet. The distance of the PCB surface to the crest of the solder wave must be set very accurately in order that the wave barely "brush" the surface of the PCB. Typically, the accuracy of this adjustment is set equal to one half the thickness of the PCB. Present procedure is to support a PCB on a pallet over the molten solder pool and adjust the height of the surface of the pool to carry out the wave solder step. This procedure is particularly costly because it is a "trial and error" procedure and usually several test "runs" must be performed as a part of the adjustment procedure.

A number of disclosures have appeared related to fixtures for manufacturing of printed circuit boards.

For example in surface mount technology, U.S. Pat. No. 5,785,307 to Chung discloses a frame for supporting a printed circuit board. Spring loaded clamps are mounted around the area with fingers that may be oriented out over the area to retain the board. The board is released when the clamp is rotated so as to orient the finger out of contact with the board. Japanese Patent 48238 to Seisakusho discloses a one touch security arrangement for securing a PCB to a table.

None of these inventions disclose a pallet for a PCB that overcome all of the problems of registration, minimizing warpage due to exposure to heat, components lifted off the board during wave solder and, frequent adjustment of the crest of the solder wave.

SUMMARY

It is an object of the invention to provide a fixture on which is securely mounted a board that is carried through the wave soldering step in the manufacture of a printed circuit board.

It is a further object that the fixture and its use have certain advantages compared to fixtures that are presently used for this purpose. These advantages include:

quick and accurate replacement of each board;

minimizing heat loss from conduction of heat into the fixture by features of the invention that permit use of thinner material for the fixture;

minimizing warpage/bowing of the board during the wave solder step;

minimizing warpage/bowing of the frame during the wave solder step;

precise positioning of the board by the fixture relative to the distance between the surface of the board to be soldered and the crest of the wave so that the location of the crest of the wave need not be adjusted from one board to the next particularly when a thickness of the board is different from one board to the next.

This invention is directed toward a fixture for supporting a board during a wave soldering operation comprising a non-metallic frame characterized by low heat absorption.

The frame has one (top) side serving as a reference surface on which the board is laid and to which the board is secured by spring loaded clips. A metallic elongated member (referred to herein as a "stiffener") preferably having a Tee cross section is provided. One leg of the Tee (stiffener) has an elongated edge joined perpendicularly to the middle of a second elongated leg. The surface of the second leg opposite the first leg is secured against the reference surface of the frame and partially overhangs the outside edge of the reference surface.

In some instances, stiffeners having other cross sections such as "L" are used.

The stiffener prevents warpage of the frame and also provides a support surface that is coplanar with the reference surface of the frame and may be in supported contact with a rail along the edges of the solder tank over the solder pool.

The board slides along the rail over the crest of the solder wave during the wave solder operation. The required distance of the surface of the board to be soldered relative to the level of the pool is thereby accurately maintained regardless of the thickness of the board.

In one embodiment, during the wave soldering step, the crest of the solder wave is adjusted to be in the same plane as the two supporting rail surfaces, each rail being along an edge of the solder tank opposite the other rail. When the board is positioned with the outside surface of the stiffener supported on the supporting rail at the edge of the solder tank, then the reference surface of the board will be in a vertical location where the crest of the solder wave will "brush" the surface of the board without excessive exposure to heat of the wave to the board surface.

In order to maintain flatness of the board during the wave soldering step, an elongated member extends across the frame and a stud secured between the center of the member and the board maintains flatness of the board.

Another feature of the invention is a removable bar extending across the frame and is positioned to confine some components so as to prevent the components from floating off the board when positioned over apertures in the board wherein the components are solder by the wave through the apertures.

BRIEF DESCRIPTION OF THE DRAWINGS

FIGS. 3A–D are sectional views showing the clamp and various stiffener styles.

FIG. 4 shows an alternative arrangement for the maintaining registration of the crest of the wave to the board and the PCB to the guide rail.

DESCRIPTION OF PREFERRED EMBODIMENTS

Figure 1A:
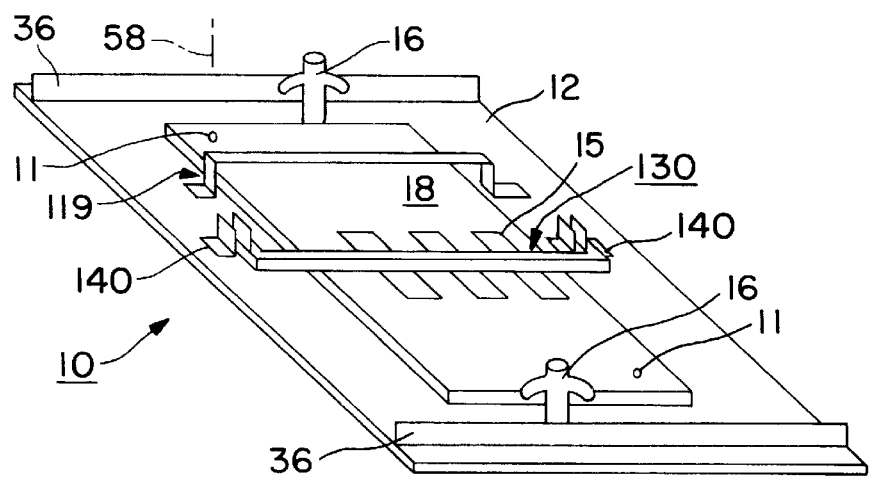
FIG. 1A is a perspective view of the wave soldering fixture of this invention.
Figure 1B:
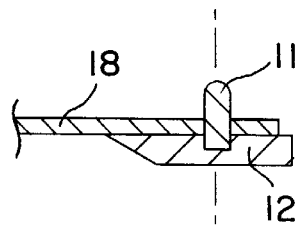
FIG. 1B shows details of the locating pins for registering the board to the frame.
Figure 2:
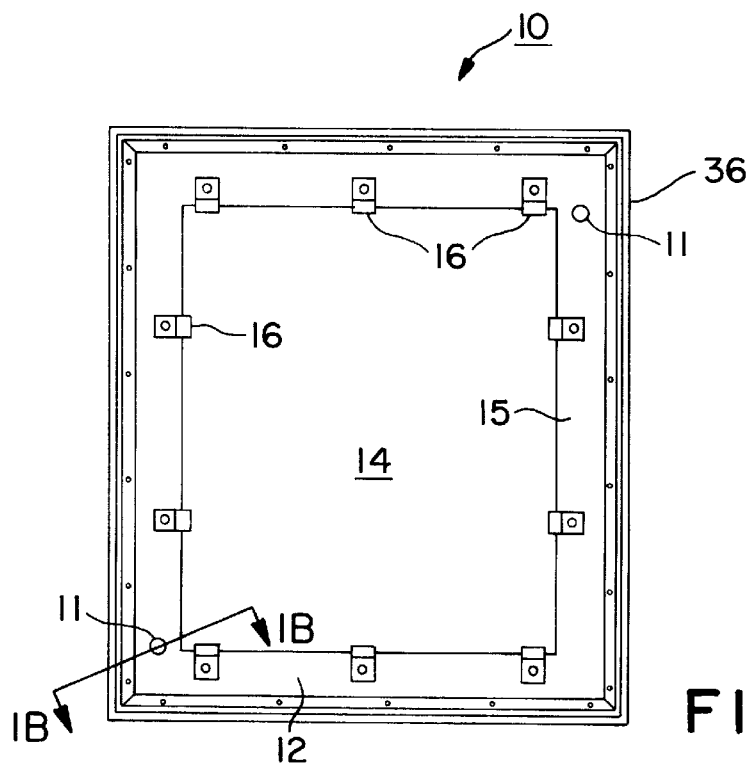
FIG. 2 is a plan view of the frame, stiffeners, and clamps.

Turning now to a discussion of the drawings, FIG. 1 shows the fixture 10 of this invention which satisfies the objects outlined in the SUMMARY. There are shown a PCB 18 mounted onto a frame 12, a plurality of hold down clamps 16 (two are shown in FIG. 1), stiffeners 36, a board support bar 114, and a hold down bar 130. As shown in detail in FIG. 1B, pair of locating pins 11 in frame 12 pass through the PCB 18 and maintain registration of the PCB 18 with the opening in the frame. 12. Details of the stiffener 36 (FIGS. 2A,B) , hold down bar 130 (FIGS. 6A–C, 7), and board support bar 114 (FIGS. 5A–D) are discussed in following paragraphs FIG. 2 shows is a plan view of the clamps and stiffeners of this invention. The fixture 10 includes a frame 12 having a rectangular frame opening 14. A plurality of spring loaded clamps 16 (ten are shown in FIG. 2) are mounted on a frame reference surface 15 of the frame 12 for detachably holding the PCB 18 on the frame reference surface 15. Details of the spring loaded clamp 16 are shown to better advantage in sectional view FIG. 3A where there are shown a clamp 16 secured on the frame reference surface 15 of the frame 12 and holding a PCB 18 against the frame reference surface 15 of the frame 12.

Each clamp includes a rod 22 having one end threaded and screwed vertically to the frame 12 permitting vertical adjustment. A helical spring 24 is mounted on the rod 22 and retained by cap 26 on the other end of the rod 22. A retainer 28 is mounted over the spring 24, retained by the pincap 26 and biased toward the frame reference surface 15 by the spring 24 bearing on a shoulder 23 of retainer 28. The retainer 28 has finger holds 30 for enabling a user to engage the finger holds 30 with his fingers and withdraw and rotate the retainer 28 away from frame reference surface 15 against bias of the spring 24 thereby permitting the user to lay the PCB 18 on the frame reference surface 15 and then rotate the retainers back to where the PCB 18 is engaged between the frame reference surface 15 and a toe 32 of the retainer 28. The spring 24 forces the toe 32 against the PCB and secures the PCB on the frame.

FIGS. 2, 3A–D also show a fixture of this invention having stiffeners 36 for resisting frame warpage during heating. The stiffeners are preferably elongated (extruded) members having a flat elongated surface. The stiffeners 36 for resisting frame warpage are securely mounted along an outside edge of the frame 12 with the flat surface 17 abutting against the frame reference surface 15 and partly overhanging the edge of the frame 12. The overhanging edge 45 of the stiffener 36 rests with a stiffener reference surface 17 against the surface of a guide rail 47 along the edge of a solder tank.

In the wave soldering operation, the fixture 10, holding the PCB 18 slides along the surface of guide rail 47 so that the crest 38 of a solder wave 39 brushes (contacts) the underside of the board 18.

The stiffener therefore serves two purposes. One purpose is to provide a stiffener reference surface 17 for maintaining registration of the bottom surface of the board with the crest of the solder wave regardless of the thicknesses of the PCBs or frame. The second purpose is to prevent warpage of the frame.

Any one of several shapes of the stiffener for preventing frame warpage may be selected as shown in the examples of FIGS.3A–D. The frame reference surface 17 of the stiffener 36 for preventing frame warpage secured against the frame reference surface 15 is coplanar with the surface 19 of the PCB 18 that is contacted by the crest 38 (FIG. 3A) of the solder wave 39. This feature permits using frames in succession that have different thicknesses without adjusting the crest of the solder wave. It also permits wave soldering in succession PCBs having different thicknesses without requiring to adjust the height of the crest. This important feature eliminates the expensive trial and error procedure of adjusting the height of the crest of the solder wave when a group of PCBs having a range of thicknesses are being wave soldered.

FIG. 3D shows a stiffener—frame which is an embodiment of this invention having several advantages over the prior art. The stiffener 36 for resisting frame warpage shown in FIG. 3D has the general Tee shaped cross section including a first elongated leg 36D having an edge perpendicularly joined to the surface of a second leg 36A,B evenly spaced from the opposing edges of the second leg 36A,B. The section 36A of the second leg on one side of the first leg is thicker than the section 36B of the second leg on the other side of the first leg 36D. The second leg 36A,B is secured with the stiffener reference surface 17 against the frame reference surface 15 of the frame 12 with the thicker section 36A parallel to and closest to the outside edge of the frame 12. The design of this stiffener for resisting board warpage provides three advantages:
1. The thick outside section of the second leg provides strength to the frame without acing like a heat sink so that a thinner frame may be used avoiding the necessity to machine steps in certain portions of the frame where thicker sections can not be permitted.
2. Reducing the thickness of the inner section of the leg reduces the heat flow from the board.
3. In the operation for manufacturing the frame assembly during which, bolt or rivet holes must be formed in the second panel to allow insertion of bolts or rivets, the thinner section of the inner section permits that these holes may be punched.

The sectional views of FIGS. 3A–F show another feature of the invention in which the lower inside corner edge 40 of the frame is chamfered, preferably 12°. This is the location where the crest of the stationary contacts the frame as the frame travels over the crest of the wave. The chamfered edge greatly reduces turbulence of the wave travelling toward the edge of the frame compared to an edge that is not chamfered.

The stiffeners 36 for resisting frame warpage are preferably made of anodized aluminum, thermoplastic or epoxy impregnated glass fiber. Anodized aluminum is preferred selected because of the resistance of the anodized aluminum surface to wetting by molten solder.

Each of the several steps in the manufacturing process subjects the frame to a time and temperature that depends on the step.

A preferred material for constructing the frame is heat resistant at least to a temperature of 350° C. and is preferrably a poor conductor of heat compared to metals. A preferred material for constructing the frame is glass fibers impregnated with a heat resistant binder. A group of satisfactory materials for this purpose are distributed by K. A. Tool and Supply Co. located in Milpitas, Calif.

The fixture also localizes heat flow by selection of a non metal for the frame of the rack and the attachment of stiffeners that resist warpage of the frame along the edges of the frame. Contour of the surface of the fixture facing the crest of the wave is selected to minimize turbulence of the wave which would otherwise interfere with an effective soldering operation.

Figure 5A:
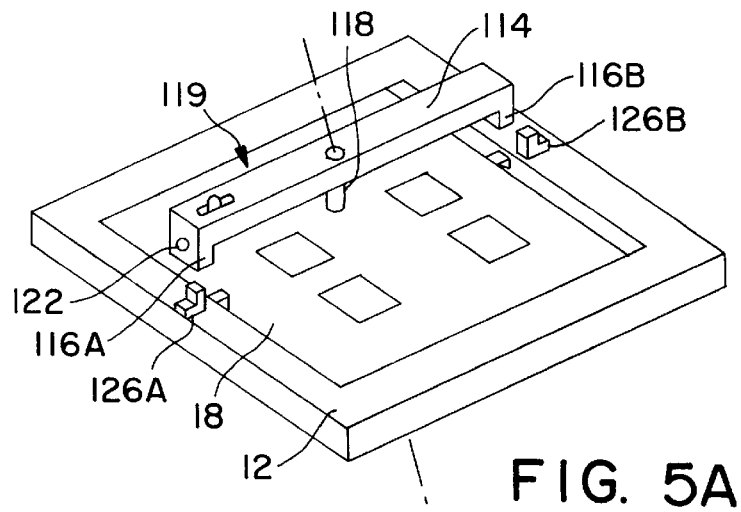
FIGS. 5A–D show a board support bar for maintaining vertical registration between PCB and solder pool and stiffeners to resist warpage of the frame.

PCBs are required having various sizes depending on the application. A problem with large PCBs is that heat applied during the wave solder operation causes the PCBs to bow up (warp) in the center of the PCB. FIG. 5A is a perspective view illustrating a PCB support mechanism 119 that minimizes the warping of the PCB. There is shown a PCB 18 positioned in frame 12. A board support bar 114 is extended across the frame 12 A pair of standoffs 116 A,B are shown on each end of member 114 which support board support bar 114 out of contact with PCB 18. A stud 118 has one end secured to board support bar 114 and an opposite end in supportive contact with PCB 18 so as to prevent heat from bowing PCB 18.

Figure 5B:
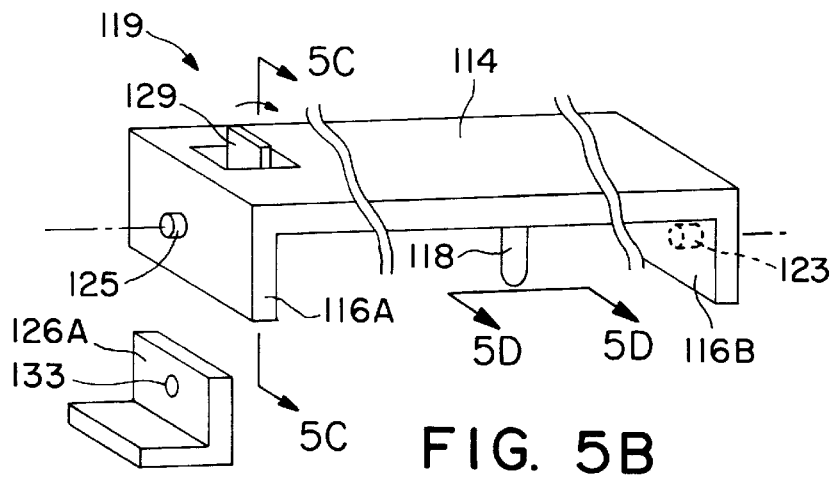
Figure 5C:
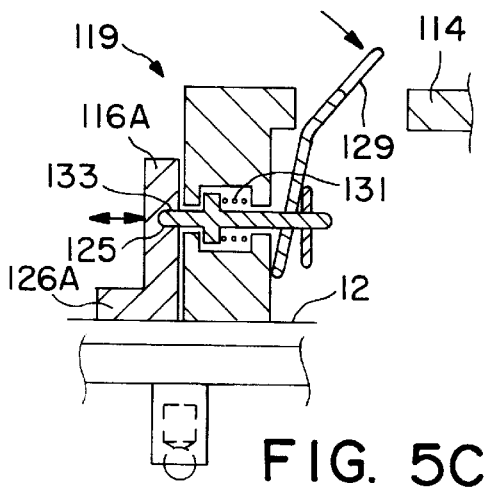
Figure 5D:
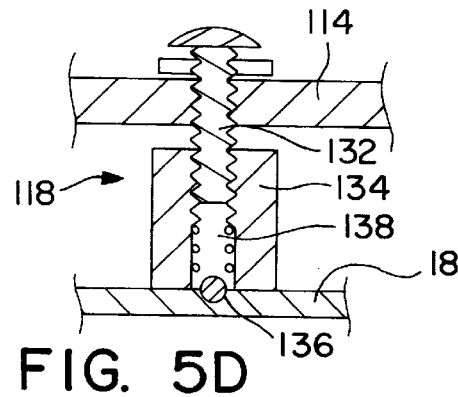

Details of the board support mechanism 119 are shown to best advantage in FIGS. 5B–D. There are shown the elongated board support bar 114 with a standoff 116A,B on each end. A fixed pin 123 (shown in phantom in FIG. 5B) protrudes from one standoff 116 B and a retractable pin 125 protrudes from the other standoff 116A. Each pin 123, 125 engages a mounting angle 126A or B respectively mounted on opposite legs of frame 12 as shown in FIG. 5A.

As shown in FIG. 5C, retractable pin 125 is withdrawn from engagement with the hole 126C in angle bracket 126A by depressing lever 129. Lever 129 is biased by spring 131 to force retractable pin 125 into engagement with the hole 133 in standoff 116A when lever 129 is not depressed thereby temporarily seculing the board support bar with the end of stud 118 against the surface of PCB 18.

Details of stud 118 are shown in FIG. 5D. Stud 118 includes a screw 132 passing through a hole in support bar 114 and screwed into one end of cylinder 134. The other end of cylinder 134 abuts the surface of the board. FIG. 5D shows another embodiemnt in which the end of the cylinder 134 has a bore enclosing a ball 136 which is biased against board 18 by spring 138. The distance of the surface of PCB 18 facing the surface of support bar 114 is adjusted by turning screw 132.

Figure 6A:
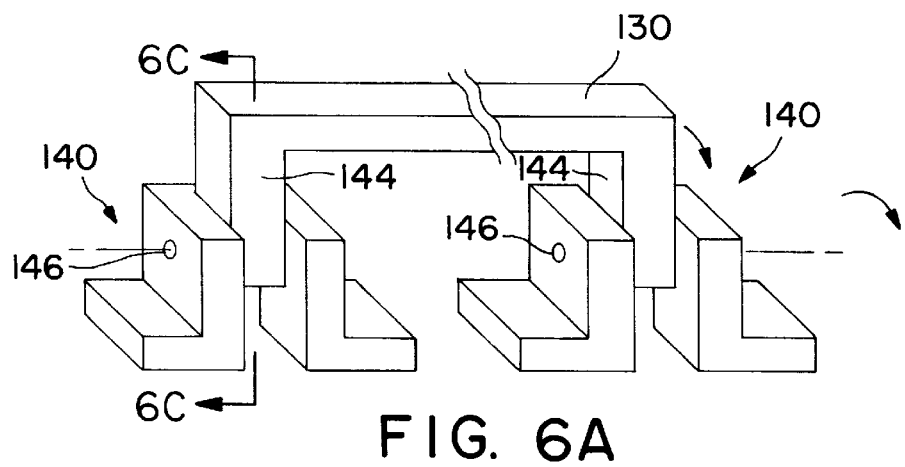
FIGS. 6A–C show a hold down bar for securing components to the PCB during the wave solder operation.
Figure 6B:
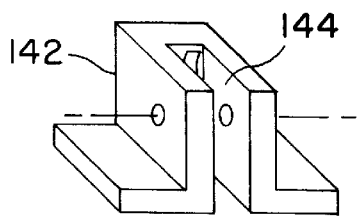
Figure 6C:
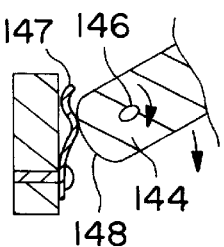

Another feature of the invention briefly mentioned in the description of FIG. 1 is a hold down bar 130 hingably mounted on the frame and positionable to confine some components so as to prevent the components from floating off the PCB when the components are positioned over apertures in the PCB during the wave soldering process. FIG. 6A shows the hold down bar 130 having a hinge 140 on each end mounted on frame 12 as shown in FIG. 1. FIGS. 6B and 6C show the hinge structure in greater detail. There is shown a block 142 (FIG. 6B) with a slot 144 for receiving an ear 144 on the ends of hold down bar 130. Ear 144 is secured in slot 144 by hinging pin 146. As shown in FIG. 6C, leaf spring 147 presses against the end surface 148 of ear 144 so that hold down bar 130 "snaps" between one position where it is distal from the PCB 18 and another position where it is forcing components 15 shown in (FIG. 1) against the PCB 18.

Figure 7:
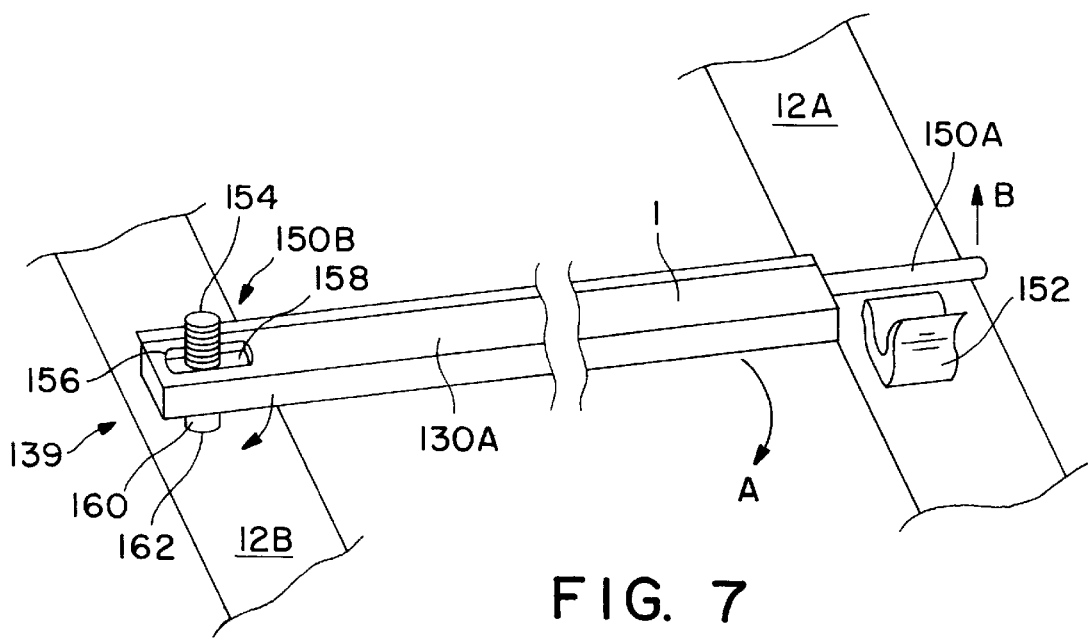
FIG. 7 shows an alternate construction of a hold down bar.

FIG. 7 shows another construction for the hold down bar 130A in which one end 150A is contoured for capture by a clip 152. Clip 152 is secured to a leg 12A of frame 12. The other end 150B of hold down bar 130A has a universal hinge 139 that permits rotating the hold down bar 130A in a plane parallel to the frame 12 (indicated by arrow A) and in planes that are perpendicular to the plane of frame 12A indicated by arrow B). The universal hinge 139 includes a bolt 154 extending through a spring 156 and slot 158 in hold down bar 130A and screwed into one end of a stud 160. The other end 162 of the stud 160 is screwed into the leg 12B of frame 12 opposite 12A.

In a preferred embodiment, the frame is machined from a sheet of fiberglass composition found by the inventor to be particularly effective in resisting warpage and degradation such as encountered in solder reflow operations. The stiffener is preferably an anodized aluminum extrusion which resists wetting by the molten solder.

There has been described a fixture for supporting a PCB in a wave soldering and/or reflow operation that has several advantages over the prior art. Advantages include a stiffener with a stiffener reference surface secured against a frame reference that maintains close registration between the crest of a solder wave and the surface of the PCB to be soldered independent of the thickness of the PCB and regardless of the thickness of the frame. This feature also elininates expensive machining of pockets in the fixture.

This feature also enables the use of registration pins extending from the frame into registration apertures in the PCB in place of the less accurate pockets of the present art. A "board support bar" is provided that prevents warpage of the PCB during wave soldering. A "hold down bar" is provided that secures components against the PCB during wave soldering. Clamps are provided designed to facilitate loading and unloading the PCB onto the frame.

The elimination of a requirement for machining pockets also permits use of a thinner frame so that absorption of heat from the solder wave is reduced.

Variations of the invention may be suggested by reading the specification and studying the drawings which are within the scope of the invention. For example FIG. 4 shows a stiffener with a spacer 36A between the stiffener reference surface 17 and the frame reference surface 15 of the frame 12 that permits adjusting the location of the crest 40 at a vertical location below the surface 80 of rail 82 that is equal to the fixed thickness of the spacer 36A. I therefore wish to define the scope of my invention by the claims.

I claim:

1. A fixture for supporting a PCB over a solder tank in a wave soldering operation which comprises:

a frame (12) having at least one frame opening (14) and a frame reference surface (15) on one side of said frame;

said frame reference surface abutting a surface (19) of the PCB (18) to be soldered when said PCB (18) is supported on said frame reference surface (15);

means for registering said PCB with said at least frame opening;

clamp (16) means for clamping the PCB to said frame reference surface (15) with said PCB extending over said at least one frame opening (14):

means for resisting warpage of said PCB during said wave soldering operation including at least one of:
   (i) a pair of stiffeners (36) for resisting warpage of said frame (12) in reaction to heat, each stiffener of said pair being an elongated member, each stiffener having a stiffener reference surface secured against said frame reference surface (15) along an outside edge of said frame reference surface opposite another stiffener of said pair of stiffeners having a stiffener reference surface (17) secured against said frame reference surface along an opposite edge of said reference surface;
   (ii) a board support means (119) mounted on said frame and extending over said PCB for resisting buckling of said PCB when said PCB is heated during a wave soldering operation;
   (iii) a hold down means (130) mounted on said frame and extending over said PCB for temporarily securing components on said PCB when said PCB is passed through a wave soldering operations;

said frame having a chamfered surface (40) forming a boundary of said frame opening arranged to minimize turbulence of said solder wave impinging on said chamfered surface of said frame.

2. A fixture for supporting a PCB over a solder tank in a wave soldering operating which comprises;

a frame (12) having at least one frame opening (14) and a frame reference surface (15) on one side of said frame;

said frame reference surface abutting a surface (19) of the PCB (18) to be soldered when said PCB (18) is supported on said frame reference surface (15);

means for registering said PCB with said at least frame opening;

clamp (16) means for clamping the PCB to said frame reference surface(15) with said PCB extending over said at least one frame opening (14);

means for resisting warpage of said PCB during said wave soldering operation comprising at one of:
   (i) a pair of stiffeners (36) for resisting warpage of said frame (12) in reaction to heat, each stiffener of said pair being an elongated member, each stiffener having a stiffener reference surface secured against said frame reference surface (15) along an outside edge of said frame reference surface opposite another stiffener of said pair of stiffeners having a stiffener reference surface (17) secured against said frame reference surface along an opposite edge of said reference surface;
   (ii) a board support means (119) mounted on said frame and extending over said PCB for resisting buckling of said PCB when said PCB is heated during a wave soldering operation;
   (iii) a hold down means (130) mounted on said frame and extending over said PCB for temporarily securing components on said PCB when said PCB is passed through a wave soldering operation.

3. The fixture of claim 1 further comprising:

said stationary support being a pair of rails of said plurality of rails, each rail attached to an edge of said solder tank opposite said other rail attached to an opposite edge of said solder tank;

each said rail having an upwardly facing elongated surface being said staionary support.

4. The fixture of claim 1 wherein each stiffener of said pair stiffeners is an extrusion.

5. The fixture of claim 1 wherein each stiffener of said pair of stiffeners is made of a material selected from a group of materials that consists of thermoplastic, epoxy impregnated glass fiber, aluminum and anodized aluminum.

6. The fixture of claim 1 wherein each stiffener of said pair of stiffeners has a Tee shaped cross section including an elongated first leg having an elongated edge perpendicularly joined to one side of a second leg at a location between and parallel to elongated edges of said second leg and said stiffener reference surface is a surface of said second leg opposite said first leg.

7. The fixture of claim 6 wherein said second leg has another side opposite said one side of said second leg having said stiffener reference surface (17) that abuts against and is secured to said frame reference surface (15) and has a portion of stiffener reference surface (17) overhanging an outside edge of said frame opposite an edge of said frame opening providing that said portion of stiffener reference surface is coplanar with said frame reference surface, faces said frame reference surface and is accessible to a stationary support for said frame.

8. The fixture of claim 7 wherein a section of said second leg closest to said edge of said frame opening is substantially thinner than a section of said second leg closest to said outside edge of said frame.

9. The fixture of claim 1 wherein each stiffener of said pair of stiffeners has an angle shaped cross section including an elongated first leg and an elongated second leg with said first leg having an elongated edge perpendicularly joined to one side of said second leg at an elongated edge of said second leg and said stiffener reference surface is an outside surface of said second leg.

10. The fixture of claim 1 which comprises a spacer (36A) between said frame reference surface and said stiffener reference surface permitting setting a vertical distance between a crest of a solder wave and a surface of said PCB placed against said stiffener reference surface that is equal to a thickness of said spacer and is independent of a thickness of said PCB.

11. The fixture of claim 1 wherein said board support means comprises:

a board support bar (114);

a means (116) for detachably supporting said board support bar in a position extending across said at least one opening of said frame (12);

one means of said pair of means (116) for detachably supporting is mounted on said frame reference surface on one side of said frame opening opposite another means of said pair of means for detachably supporting mounted on an opposite side of said frame opening;

a stud (118) having one end secured to said board support intermediate ends of said board support bar;

said stud (118) arranged with an end to contact said PCB at a location when said PCB (18) is positioned on said frame (12);

said location operably selected to enable said stud and board support bar to resist warpage of said board when said PCB mounted over said frame opening is exposed to heat of wave soldering.

12. The fixture of claim 1 wherein said stud comprises:

a spring loaded ball mounted in another end of said stud;

said stud (118) arranged to permit said ball to contact said PCB at a location when said PCB (18) is positioned on said frame (12);

said location operably selected to enable said stud and board support bar to resist warpage of said board when said PCB mounted over said frame opening is exposed to heat of wave soldering.

13. The fixture of claim 10 wherein said means for detachably supporting comprises:

a pair of mounting angles (126A,B), each having one leg secured to said frame reference surface and another leg extending away from said frame reference surface;

said another leg of each mounting angle having an aperture;

a pair of standoffs (116A,B) one standoff of said pair of standoffs mounted on one end of said board support bar and another standoff of said pair of standoffs mounted on another end of said board support bar;

a fixed pin (123) extending from said one standoff operably arranged to engage said aperture in said another leg of one of said mounting angles;

manually retractable pin (125) extending from said another standoff operably arranged to engage said aperture in said another leg of another one of said mounting angles;

said fixed pin and said retractable pin arranged in operable combination with said respective standoff and said respective mounting angle to permit engagement of said fixed pin in said aperture of one mounting angle and retractable engagement of said retractable pin in said aperture of said other mounting angle and said board support bar is positionable:
  (i) in one position wherein with said ends of said board support bar secured to said frame reference surface with said stud abutting said PCB mounted against said frame reference surface over said frame opening; and
  (ii) another position wherein said board support bar is removed from said frame by disengaging said retractable pin from said respective aperture in said mounting angle.

14. The fixture of claim 1 wherein an angle of said chamfered surface is about twelve degrees.

15. The fixture of claim 1 wherein said frame is made from non-metallic material.

16. The fixture of claim 15 wherein said nonmetallic material is glass fiber impregnated by a binder.

17. The fixture of claim 1 wherein said clamp means comprises at least one clamp member, each said clamp member mounted on said frame reference surface and having a toe spring biased toward said frame reference surface arranged for detachably engaging a PCB between said toe and said frame reference surface.

18. The fixture of claim 15 wherein said clamp member comprises:

a stud perpendicularly mounted on said frame reference surface;

a helical spring mounted concentrically onto said stud;

a sleeve slidably mounted over said stud and said spring;

said sleeve having said toe on an end closest to said frame reference surface and extending over said frame reference surface;

said sleeve having a finger grip on an end of said sleeve opposite said toe;

said stud having a retainer cap on an end of said stud distal from said frame reference surface for retaining said sleeve and said spring on said stud;

said stud, spring and sleeve all arranged in operable combination to enable a user to seize said finger grip and draw said toe away from said frame reference surface and slide said PCB between said toe and said frame reference surface then release said finger grip whereby said PCB is detachably attached to said frame.

19. The fixture of claim 1 wherein said hold down means comprises:

a hold down bar (130);

means (140) for hingably attaching each end of said hold down bar to said frame reference surface operably arranged to secure components in position on said frame reference surface when said hold down bar is oriented in a first position toward said frame reference surface and to release said components when said hold down bar is oriented in a second position distal from said frame reference surface.

20. The fixture of claim 19 comprising spring means (147) in operable combination with said hold down bar (130) to bias said hold down bar toward said frame reference surface when said hold down bar is proximal to said frame reference surface and to bias said hold down bar away from said frame reference surface when said hold down bar is distal from said frame reference surface.

21. The fixture of claim 1 wherein said hold down means comprises:

a hold down bar (13);

a clip (152) mounted on one leg (12A) of said frame reference surface on one side of said frame opening;

said hold down bar (13A) having one end (150A) operably contoured in combination with said clip to detachably engage said clip;

a universal hinge (139) mounted on another leg (12A) of said frame reference surface on another side of said frame opening wherein said one leg of said frame reference surface is opposite said another leg of said frame reference surface;

said universal hinge (139) operably arranged in combination with another end of said hold down bar to permit positioning said hold down bar to engage said clip (152) permitting that, when said one end of said hold down bar is engaged with said clip, said hold down bar is positioned to secure components against said PCB and when said one end is disengaged from said clip, said components are released from said PCB.

22. The fixture of claim 1 wherein said means for registering comprises:

said PCB having a plurality of registration apertures;
a plurality of registration pins protruding from said frame reference surface;
each registration pin of said plurality of registration pins located to engage one registration aperture of said plurality of registration apertures when said PCB is laid in contact with said frame reference surface.

* * * * *